(12) United States Patent
Tzeng et al.

(10) Patent No.: US 6,245,400 B1
(45) Date of Patent: Jun. 12, 2001

(54) FLEXIBLE GRAPHITE WITH NON-CARRIER PRESSURE SENSITIVE ADHESIVE BACKING AND RELEASE LINER

(75) Inventors: Jing-Wen Tzeng, Brunswick; George Getz, Jr., Parma Heights; Thomas William Weber, Cleveland, all of OH (US)

(73) Assignee: UCAR Graph-Tech Inc., Lakewood, OH (US)

( * ) Notice: Subject to any disclaimer, the term of this patent is extended or adjusted under 35 U.S.C. 154(b) by 0 days.

(21) Appl. No.: 09/167,865

(22) Filed: Oct. 7, 1998

(51) Int. Cl.⁷ ....................................................... B32B 33/00
(52) U.S. Cl. ........................ 428/40.1; 423/448; 428/40.2; 428/143; 428/319.1; 428/323; 428/408
(58) Field of Search .................................. 428/40.1, 40.2, 428/408, 143, 319.1, 323; 423/448

(56) References Cited

U.S. PATENT DOCUMENTS

| | | | |
|---|---|---|---|
| 3,404,061 | 10/1968 | Shane et al. | 161/125 |
| 4,895,713 | 1/1990 | Greinke et al. | 423/448 |
| 4,961,991 | 10/1990 | Howard | 428/246 |
| 5,130,199 | 7/1992 | Howard | 428/408 |
| 5,149,518 | 9/1992 | Mercuri et al. | 423/449 |
| 5,176,863 | 1/1993 | Howard | 264/113 |
| 5,198,063 | 3/1993 | Howard et al. | 156/282 |
| 5,443,894 | 8/1995 | Pollock et al. | 428/213 |
| 5,494,506 | 2/1996 | Ford et al. | 55/502 |

FOREIGN PATENT DOCUMENTS

| | | |
|---|---|---|
| 1583200 | 10/1969 | (FR) . |
| 03202342 | 9/1991 | (JP) . |
| 05286105 | 11/1993 | (JP) . |
| 08253760 | 10/1996 | (JP) . |
| 11058591 | 3/1999 | (JP) . |

*Primary Examiner*—Nasser Ahmad
(74) *Attorney, Agent, or Firm*—Frederick J. McCarthy

(57) ABSTRACT

A release lined pressure sensitive adhesive flexible graphite sheet article is provided having low thermal resistance properties comparable to the flexible graphite material itself when compared to prior art PSA sheet products and wherein the release liner is easily removed with the sheet is to be used without any significant delamination of the flexible graphite. The flexible graphite sheet comprises a flexible graphite substrate, an adhesive primer coating thereon, a pressure sensitive adhesive coating on the adhesive primer coating and a release liner applied to the pressure sensitive adhesive coating. Double sided pressure sensitive adhesive flexible graphite sheets can also be made using the method of the invention. It has been found that the use of an adhesive primer coating on the flexible graphite substrate applied from an emulsion as a coating and dried instead of the prior art adhesive containing polymer layer applied as a solid film, such as Mylar film, provide the above desired thermal resistance properties and also enable the use of less pressure sensitive adhesive on the sheet thereby maintaining the low thermal resistance properties of the flexible graphite. Partial coverage of the pressure sensitive adhesive on the sheet article surface for minimizing the thermal resistance of the sheet is also provided.

5 Claims, 2 Drawing Sheets

FLEXIBLE GRAPHITE WITH NON-CARRIER PRESSURE SENSITIVE ADHESIVE BACKING AND RELEASE LINER

BACKGROUND OF THE INVENTION

1. Field of the Invention

The present invention relates to a release lined pressure sensitive adhesive (PSA) flexible graphite product and, in particular, to a release lined PSA flexible graphite sheet article for thermal interface applications wherein the thermal properties of the flexible graphite sheet article are not significantly affected by a pressure sensitive adhesive used to bond the flexible graphite and which release liner is easily removed when the sheet is to be used without any significant delamination of the flexible graphite.

2. Description of Related Art

Flexible graphite is a well-known material used in a variety of industrial, commercial and domestic applications because of its chemical inertness and unique electrical and thermal conduction properties. It is of particular use as a gasketing or sealing material in automobile engines, piping flanges and vessel joints and as a fire proof covering for walls or floors, filtering devices for an air bag for generators, etc. wherein thin flexible graphite sheets between typically 2–70 mil are cut into various sizes to use from the product.

The process for manufacturing flexible graphite is well-known and the typical practice is described in U.S. Pat. No. 3,404,061 to Shane et al., the disclosure of which is incorporated herein by reference. In general, flakes of natural graphite are intercalated in an acid solution. After the flakes are intercalated they are washed and dried and then exfoliated by exposure to a high temperature or under a flame for a short period of time. This causes the flakes to expand or exfoliate in a direction perpendicular to the crystalline planes of the graphite. The exfoliated graphite flakes are vermiform in appearance and are therefore commonly referred to as worms. The worms may be compressed into sheets or foils with a density approaching theoretical density although a density of about 70 lbs/ft$^3$ is considered typical for most applications. The sheets of flexible graphite can be cut into any desired configuration to suit a particular application.

New applications requiring a low thermal resistance interface sheet material include thermal joints and heat sinks A typical use is to thermally connect a computer chip to a cooling module. Flexible graphite is readily applicable to such applications because of its low thermal resistance and its ability to conform to the surfaces to be interfaced, especially when either or both surfaces are not completely flat. Prior art self bonding flexible graphite sheet articles typically use a PSA backing with a Mylar film as the adhesive carrier. This type sheeting however is not desirable for applications requiring low thermal resistance because the adhesive carrier cannot be cut and processed easily and the adhesive carrier has an extremely high thermal resistance. Additionally, twice the amount of adhesive is needed since there is adhesive on both sides of the Mylar carrier film. The sheeting also lacks mechanical integrity since the carrier film and adhesive typically readily separate from the flexible graphite substrate.

Bearing in mind the problems and deficiencies of the prior art it is therefore an object of the present invention to provide a release lined pressure sensitive adhesive flexible graphite article of manufacture and, in particular, a thermal interface sheet article having a low thermal resistance and which release liner is easily removed when the sheeting is to be used without any significant delamination of the flexible graphite substrate.

It is another object of the present invention to provide a method of making a release lined pressure sensitive adhesive flexible graphite article of manufacture, particularly a thermal interface sheet article having a low thermal resistance and which release liner is easily removed when the sheeting is to be used without any significant delamination of the flexible graphite substrate.

Still other objects and advantages of the invention will in part be obvious and will in part be apparent from the specification.

SUMMARY OF THE INVENTION

The above and other objects and advantages, which are apparent to one of skill in the art, are achieved in the present invention which is directed to, in a first aspect, an article of manufacture having low thermal resistance as a release lined pressure sensitive adhesive flexible graphite thermal interface sheet article having low thermal resistance when compared to a sheet of flexible graphite and flexible graphite PSA prior art sheet articles comprising:

a flexible graphite substrate having a surface for receiving an adhesive primer coating;

an adhesive primer coating on the flexible graphite substrate surface which adheres to the flexible graphite;

a pressure sensitive adhesive coating on the adhesive primer coating which is adherent to the adhesive primer coating; and a release liner on the pressure sensitive adhesive coating which release liner is easily removed when the sheet is to be used without any significant delamination of the flexible graphite substrate.

In another aspect of the present invention the release lined pressure sensitive adhesive flexible graphite article comprises a pressure sensitive adhesive coating on each side of the flexible graphite substrate providing a double sided pressure sensitive adhesive flexible graphite article of manufacture.

In a further aspect of the invention, a method is provided for making a release lined pressure sensitive adhesive flexible graphite article of manufacture, including thermal interface sheet articles having a low thermal resistance when compared to a sheet of flexible graphite sheet and prior art flexible graphite PSA sheet articles comprising:

supplying a flexible graphite substrate having a surface for receiving an adhesive primer coating;

applying a coating of an adhesive primer on the flexible graphite substrate surface which adheres to the flexible graphite;

applying a pressure sensitive adhesive coating on the adhesive primer coating to adhere the pressure sensitive adhesive coating to the adhesive primer coating; and applying a release liner on the pressure sensitive adhesive coating which release liner is easily removed when the article is to be used without any significant delamination of the flexible graphite substrate.

In another aspect of the invention, the release liner may be applied as a pressure sensitive adhesive containing transfer tape comprising a liner, a release material such as silicone on the liner and a pressure sensitive transferable adhesive on the release material. Thus, both the pressure sensitive adhesive and release liner may be applied in one step to form the sheet article of the invention.

In a further aspect the present invention relates to a method of using the release lined pressure sensitive adhesive flexible graphite article of manufacture which comprises removing the release liner from the pressure sensitive adhesive surface and then pressing the article onto a surface to which the article is to be bonded.

BRIEF DESCRIPTION OF THE DRAWINGS

The features of the invention believed to be novel and the elements characteristic of the invention are set forth with particularity in the appended claims. The figures are for illustration purposes only and are not drawn to scale. the invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
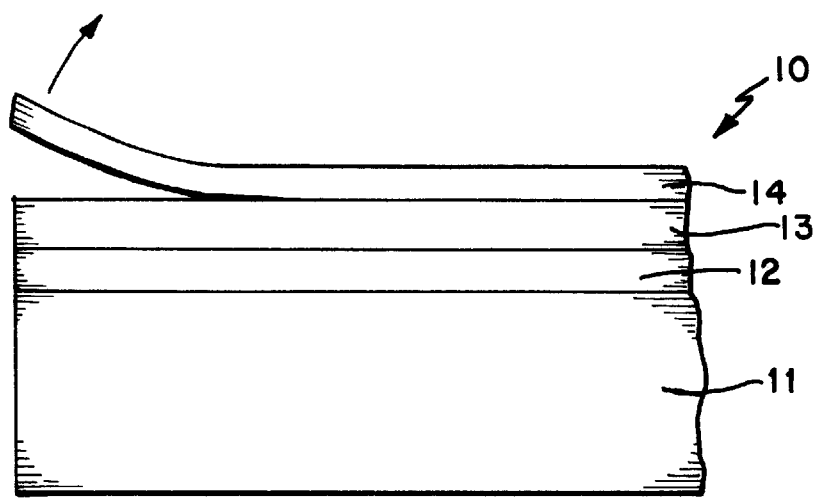
FIG. 1 is a side elevational view of a pressure sensitive adhesive flexible graphite sheet article of the invention.

In describing the preferred embodiment of the present invention, reference will be made herein to FIGS. 1–6 of the drawings in which like numerals refer to like features of the invention. Features of the invention are not necessarily shown to scale in the drawings.

As described in U.S. Pat. No. 5,176,863, the disclosure of which is incorporated herein by reference, graphite is a crystalline form of carbon comprising atoms bonded in flat layered planes with weaker bonds between the planes. By treating particles of graphite, such as natural graphite flake, with an intercalant of, e.g., a solution of sulfuric and nitric acid, the crystal structure of the graphite reacts to form a compound of graphite and the intercalant. The treated particles of graphite are hereafter referred to as "particles of intercalated graphite". Upon exposure to high temperature, the particles of intercalated graphite expand in dimensions as much as 80 or more times its original volume in an accordion-like fashion in the c-direction, i.e., in the direction perpendicular to the crystalline planes of the graphite. The exfoliated graphite particles are vermiform in appearance, and are therefore commonly referred to as worms. The worms may be compressed together into flexible sheets which, unlike the original graphite flakes, can be formed and cut into various shapes.

A common method for manufacturing graphite foil from flexible graphite is described by Shane et al. in U.S. Pat. No. 3,404,061, the disclosure of which is also incorporated herein by reference. In the typical practice of the Shane et al. method, natural graphite flakes are intercalated by dispersing the flakes in a solution containing an oxidizing agent of e.g. a mixture of nitric acid and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium, chromate, potassium dichromate, perchloric acid and the like, or mixtures, such as for example, concentrated nitric acid and chlorate, chromic acid and phosphoric acid, sulfuric acid and nitric acid, or mixtures of a strong organic acid, e.g., trifluoracetic acid, and a strong oxidizing agent soluble in the organic acid.

A preferred intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent.

After the flakes are intercalated excess solution is drained from the flakes. The quantity of intercalation solution retained on the flakes after draining is typically greater than 100 parts of solution by weight per 100 parts by weight of graphite flakes (pph) and more typically about 100 to 150 pph. After washing with water, the intercalated graphite flakes are dried and then exfoliated into flexible graphite by exposing them to a flame or heat for only a few seconds at temperature typically greater than 700° C., more typically 1000° C. or higher.

The quantity of the intercalation solution may be limited to between 10 to 50 parts of solution per hundred parts of graphite by weight (pph) which permits the washing step to be eliminated as taught and described in U.S. Pat. No. 4,895,713 the disclosure of which is also herein incorporated by reference. The exfoliated graphite particles or worms are then compressed and rolled into a densely compressed flexible graphite foil sheet of desired density and thickness. Suitable exfoliation methods and methods or compressing the exfoliated graphite particles into thin foils are disclosed in the aforementioned U.S. Pat. No. 3,404,061 to Shane et al. It is conventional to roll and compress the exfoliated worms in stages with the product of the first or early stages of compression referred to in the art as "flexible mat". The flexible mat is then further compressed into a standard density sheet or foil of preselected thickness. A flexible graphite mat may be compressed into a thin sheet or foil of between 0.5–500 mils, typically 2–70 mils in thickness with a density approaching theoretical density, although a density of about 10 to 100 lbs./ft.$^3$, generally about 70 lbs./ft.$^3$ is acceptable for most applications. The compressed flexible graphite sheet can be mechanically processed (e.g., rolling) to form a crinkle surface or to form a corrugated sheet.

It is an important feature of the invention that an adhesive coating be used as a bonding agent between the flexible graphite substrate and the pressure sensitive adhesive (PSA) of the sheet article. The flexible graphite substrate can be a plain sheet, e.g., smooth, or a crinkle sheet, a corrugated sheet, etc. The presence of an adhesive primer coating provides tack or adhesive strength for bonding both the PSA and the flexible graphite which adhesive strength enables clean and even separation of a release liner on the PSA from the PSA. It has also been found that the use of adhesive primer coating also minimizes delamination of flexible graphite during the separation of the release liner from the PSA (i.e., peeling the release liner off the flexible graphite PSA gasket when the sheeting is ready to be used). In addition, it has been found that the thermal resistance of the flexible graphite of the PSA flexible graphite sheeting article is not substantially detrimentally affected by the presence of an adhesive primer coating and a pressure sensitive adhesive as compared and contrasted to the use of a plastic film or plastic carrier layer such as Mylar in the prior art products. The thickness of the PSA coating on the sheeting can also be thinner compared to the prior art PSA films when an adhesive carrier film such as Mylar is used. The presence of an adhesive thin primer layer also protects and supports the surface integrity of the flexible graphite substrate particularly when thin flexible graphite sheets are used typically less than about 15 mils.

The flexible graphite substrate can be of any suitable thickness and density. Typically, ranges of thickness and density are about 3–100 mils and 50–100 $Lb/ft^3$, respectively. However the density can range from 5 to 137 $lb/ft^3$ and the thickness from 0.1 mil to 500 mil or larger.

The adhesive primer coating may be any suitable adhesive substance, inorganic or organic, natural or synthetic, that is capable of bonding two surfaces together by surface attachment. The adhesive primer coating is typically an emulsion and is preferably a compounded or uncompounded monomer or synthetic resin selected from a wide range of thermoplastic or thermoset resins including phenolics, esters, acrylics, vinyl acetate, paraffin waxes, polyethylene and polypropylene.

A wide range of adhesive primer coating thicknesses may be employed with thinner coatings being generally more suitable for applications requiring low thermal resitance properties. Exemplary adhesive primer coating thicknesses are generally less than 1 mil, typically less than 0.5 mil, and most preferably 0.01 mil to 0.1 mil, e.g., 0.05 mils.

The primer coating may be applied in a variety of ways such as spraying, immersion (dipping) etc., and is preferably roll coated onto the flexible graphite substrate surface using a pair of spaced rolls or rollers (calender rolls) of horizontal axial alignment through which the flexible graphite passes and is then coated with the primer. The adhesive primer is on one of the rollers when a single sided gasket is being made. The primer is then formed to an adhesive condition by drying usually in forced air dryer at an elevated temperature of about 100° C. for less than 1 minute. A preferred adhesive primer coating material because of its demonstrated effectiveness is a water based phenolic/latex adhesive containing 35.5% solids, and having a pH of about 9 a viscosity of 25 cps (ASTM 1084-63 based on Brookfield LV #1/60RPM @ 25° C.) and a density of 8.73 lb/gal.

The pressure sensitive adhesive can be any of a number of commercially available pressure sensitive adhesives as is well known in the art. The thickness of the PSA layer may vary widely and is typically in the range of 0.1 mils to 3 mils. A preferred PSA because of its demonstrated effectiveness is a non-supported acrylic PSA film which is commercially available as IF 3052 (1 mil thick version) and is sold by Mac Tac of Stow, OH. The PSA adhesive may then be applied on the adhesive primer coating by a typical rubber coated calender station. The PSA coating may also be applied to the primer coating on the flexible graphite substrate by any suitable method as for the primer coating such as roll coating.

Any suitable adhesive release liner may be used such as silicone-coated Kraft and polyethylene film. Likewise, the thickness and density of a release liner may vary widely typically ranging from 1 mil to 10 mils and 50–100 $lb/ft^3$ respectively. The release liner may be applied to the pressure sensitive adhesive coating by roll coating. Typically, the release liner is supplied as an adhesive transfer tape containing a PSA coating which is transferred onto the adhesive primer coating. The tape is applied to the adhesive primer layer typically by rolling forming the finished sheet product.

Broadly stated, the release lined PSA flexible graphite sheet article of the invention may be made by applying a coating of an adhesive primer material by spraying, immersing, rolling, etc. the adhesive onto the flexible graphite substrate surface. The PSA would likewise then be applied by rolling or by using a release liner PSA transfer tape as described above to provide the finished product. All of the above steps may be performed in the same operational sequence by using, e.g., a series of rollers and feeding mechanisms.

Referring now to the figures, FIG. 1 shows a single sided release lined PSA flexible graphite sheet article of the invention generally as 10. The sheet 10 comprises a flexible graphite substrate 11 having a coating 12 of an adhesive primer material. On the primer coating 12 is a PSA coating 13. A release liner 14 is on top of the PSA coating and is shown being peeled (removed) from the PSA coating 13 by pulling thereon in the direction of the arrow removing the release lever 14 and leaving the PSA coating 13 on the adhesive primer coating 12.

Figure 2:
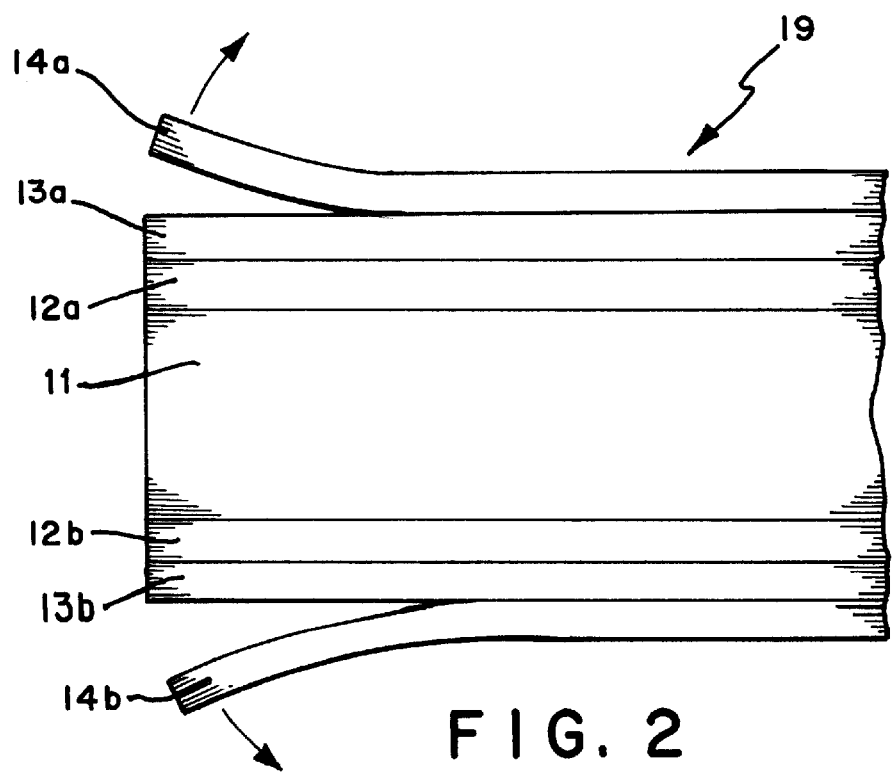
FIG. 2 is a side elevational view of a double sided pressure sensitive adhesive flexible graphite sheet article of the invention.

Referring to FIG. 2, a two sided release lined pressure sensitive adhesive flexible graphite sheet article is shown generally as 19. The two sided sheeting 19 has a central flexible graphite substrate 11. On each side of the flexible graphite substrate 11, in sequence, is an adhesive primer coating 12a and 12b, a PSA coating 13a and 13b and a release liner 14a and 14b. Both release liners 14a and 14b are shown being removed from the PSA coating in the direction of the arrow leaving the PSA coatings on the adhesive primer coatings.

Figure 3:
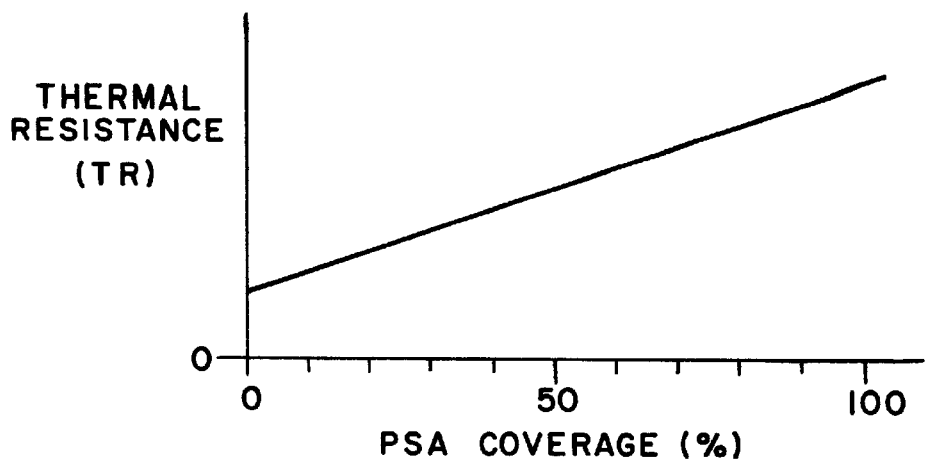
FIG. 3 is a schematic of a graph showing the correlation between the thermal resistance properties and pressure sensitive adhesive coverage on the surface of flexible graphite of a pressure sensitive adhesive flexible graphite sheet article of the invention.

FIG. 3 shows a schematic of a graph of the thermal resistance of a sheet article of the invention versus the % pressure sensitive adhesive coverage on the surface of the sheet. It can be seen that as more pressure sensitive adhesive covers the surface of the sheet the thermal resistance of the sheet is increased in a substantially linear relationship. It is an important feature of the invention that using an adhesive primer coating a smaller amount of PSA than in the prior art as described above may be used to provide the necessary adhesive properties for effective thermal interface applications while still providing low thermal resistance properties of the sheet comparable to the thermal resistance properties of a plain flexible graphite sheet especially when compared to prior art sheet products. This is not found in the prior art when a film of Mylar or other polymer film is used as a carrier for the PSA.

Figure 4A:
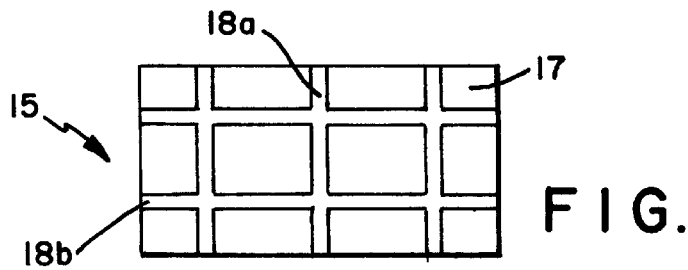
FIG. 4A is a top plan view of a pressure sensitive adhesive flexible graphite sheet article of the invention having a square crisscross pattern of pressure sensitive adhesive on the gasket.
Figure 4B:
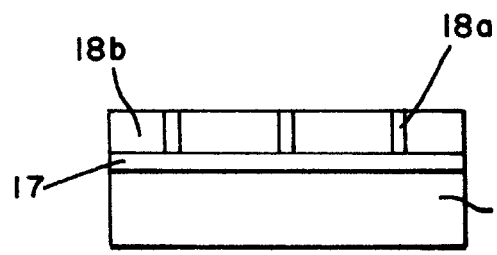
FIG. 4B is a side elevational view of the gasket of FIG. 4A.

Referring to FIGS. 4A and 4B, top plan view of a sheet without a release liner is shown generally as 15 and comprises a flexible graphite substrate 16, a primer coating 17 and a PSA coating 18a and 18b in the form of transverse criss-crossing PSA lines. The adhesive covers only a portion, i.e., 10–80%, typically 20–60%, of the surface of the sheet 15 which results in a lower thermal resistance of the sheet as shown in FIG. 3.

Figure 5:
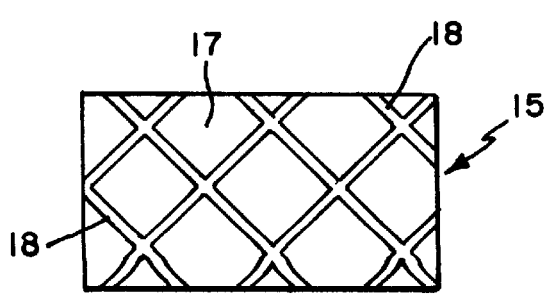
FIG. 5 is a top plan view of a pressure sensitive adhesive flexible graphite sheet article of the invention having a diagonal crisscross pattern of pressure sensitive adhesive coating on the gasket.

FIG. 5 shows another pressure sensitive adhesive flexible graphite sheet patterned with a diagonal crisscrossing pattern of PSA material. Thus, the sheet shown generally as 15, has an adhesive primer coating 17 having thereon crisp crossing pressure sensitive adhesive lines 18. Similarly, in FIG. 6, a flexible sheet 15 is shown having an adhesive primer coating 17 with a pressure sensitive adhesive 18 thereon in the form of lettering.

Various embodiments of the present invention will now be illustrated by reference to the following specific examples. It will be understood, however, that such examples are presented for purposes of illustration only and the present invention is in no way to be seen as limited thereby.

EXAMPLE 1

A flexible graphite sheet about 5 mils thick and 70 lb/ft$^3$ density was roll coated at a resin thickness of about 0.05 mils with a water based modified phenolic resin as described above. The resin is in the form of a water based emulsion and is applied at a temperature of about 23° C. (room temperature). The resin coated flexible graphite is dried at about 100° C. for less than 1 minute to form an adhesive primer coating on the flexible graphite. The phenolic resin coated flexible graphite sheet was then coated (laminated) with an acrylic PSA transfer tape by applying the transfer tape onto the substrate rolling. The transfer tape is a silicone coated Kraft release liner having a PSA coating. The PSA coating adheres to the phenolic resin adhesive primer coating. The thermal resistance of the sheet is about 0.16° C. in$^2$/W. This thermal resistance value is less than about 30% of a typical thermal resistance of about 0.5 for a 5 mil flexible graphite pressure sensitive sheet using a Mylar film (Mylar film uses a double sided adhesive to adhere the Mylar film carrier to the flexible graphite). A flexible graphite sheet of about 5 mils has a thermal resistance of about 0.03. Thus, it can be seen that the detrimental effect of the PSA on the thermal properties of the sheet article of the invention is significantly less as compared to the Mylar type sheet products of the prior art. The flexible graphite sheet when peeled from the liner was smooth and free of wrinkles indicating excellent surface mechanical integrity and no delamination of the flexible graphite substrate.

EXAMPLE 2

Figure 6:
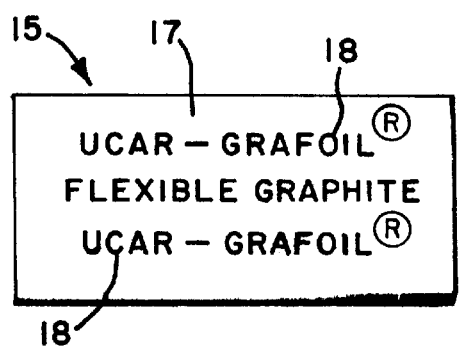
FIG. 6 is a top plan view of a pressure sensitive adhesive flexible graphite sheet article of the invention having a lettered adhesive design on the sheet.

The overall thermal resistance of a PSA flexible graphite sheet product of the invention is substantially reduced by reducing the coverage area of the adhesive on the sheet as shown in FIG. 3. For example, the thermal resistance of a flexible graphite sheet with about 20% adhesive coverage is about 80% lower than that of an entire sheet covered with a PSA material. Measurement results confirm that interfacial thermal resistance between two flexible graphite sheets is negligible contributing to the super conformability. The pressure sensitive adhesive can be put on the flexible graphite primed sheet by either silk screen printing or pre-patterned adhesive roll lamination. Examples of such PSA printed pattern coatings are shown in FIGS. 4A, 5 and 6.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An article of manufacture having low thermal resistance a release lined pressure sensitive adhesive flexible graphite thermal interface sheet comprising:
   a flexible graphite substrate having a surface for receiving an adhesive primer coating;
   an adhesive primer coating on the flexible graphite substrate surface which adheres to the flexible graphite;
   a pressure sensitive adhesive coating on the adhesive primer coating which is adherent to the adhesive primer coating; and
   a release liner on the pressure sensitive adhesive coating which release liner is easily removed when the sheet is to be used without any significant delamination of the flexible graphite substrate.

2. The article of claim 1 wherein the adhesive primer coating is a modified phenolic resin.

3. The article of claim 2 wherein the pressure sensitive adhesive coating is an acrylic.

4. The article of claim 1 wherein both sides of the flexible graphite have an adhesive primer coating, pressure sensitive adhesive coating and a release liner.

5. The article of claim 1 wherein the pressure sensitive adhesive covers only a portion of the adhesive primer coating.

* * * * *

UNITED STATES PATENT AND TRADEMARK OFFICE
CERTIFICATE OF CORRECTION

PATENT NO. : 6,245,400 B1
DATED : June 12, 2001
INVENTOR(S) : Tzeng et al.

It is certified that error appears in the above-identified patent and that said Letters Patent is hereby corrected as shown below:

<u>Column 5,</u>
Line 19, "...50-100 Lb/ft$^3$, respec-" should read as -- ...50-100 lb/ft$^3$, respec- --.

<u>Column 6,</u>
Line 67, "...thereon crisp" should read as -- ...thereon criss- --.

Signed and Sealed this

Fourth Day of June, 2002

*Attest:*

JAMES E. ROGAN
*Attesting Officer*   *Director of the United States Patent and Trademark Office*